United States Patent
Yoo et al.

(10) Patent No.: US 8,607,260 B2
(45) Date of Patent: Dec. 10, 2013

(54) SLIP PREVENTION MEMBER FOR TURNTABLES

(75) Inventors: Young Sun Yoo, Gyunggi-do (KR); Yeol Choi, Gyunggi-do (KR); Jun Kyu Park, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 91 days.

(21) Appl. No.: 12/716,166

(22) Filed: Mar. 2, 2010

(65) Prior Publication Data

US 2011/0167439 A1    Jul. 7, 2011

(30) Foreign Application Priority Data

Jan. 4, 2010 (KR) .................. 10-2010-0000194

(51) Int. Cl.
*G11B 17/022* (2006.01)

(52) U.S. Cl.
USPC ............ 720/715; 720/697; 720/698; 720/716

(58) Field of Classification Search
USPC .................................. 720/715–717, 697–698
See application file for complete search history.

(56) References Cited

U.S. PATENT DOCUMENTS

| 3,568,593 | A | * | 3/1971 | Papadopoulos | 101/93.34 |
| 4,079,277 | A | * | 3/1978 | Osanai | 310/90 |
| 5,995,480 | A | * | 11/1999 | Naka et al. | 720/716 |
| 6,154,436 | A | * | 11/2000 | Yeon | 720/700 |
| 8,454,518 | B2 | * | 6/2013 | Saito | 600/459 |
| 2003/0210497 | A1 | * | 11/2003 | Aoishi et al. | 360/133 |
| 2005/0013862 | A1 | * | 1/2005 | Tobyn et al. | 424/472 |
| 2007/0000119 | A1 | * | 1/2007 | Masuda et al. | 29/598 |

* cited by examiner

*Primary Examiner* — Will J Klimowicz
*Assistant Examiner* — Carlos E Garcia
(74) *Attorney, Agent, or Firm* — Blakely Sokoloff Taylor & Zafman LLP

(57) ABSTRACT

Disclosed herein is a slip prevention member for a turntable. A friction layer prevents a slip of a disk placed on an upper surface thereof. A hardness reinforcing layer is provided under the lower surface of the friction layer. An adhesive layer is provided under the lower surface of the hardness reinforcing layer. A releasable sheet is attached to the lower surface of the adhesive layer. The slip prevention member reduces use of environmentally toxic material and uses the hardness reinforcing layer, thus preventing occurrence of vibrations and noise which may be induced when the hardness of the slip prevention member is relatively low.

8 Claims, 3 Drawing Sheets

110 120 130 140

110 120 130 150

SLIP PREVENTION MEMBER FOR TURNTABLES

CROSS REFERENCE TO RELATED APPLICATION

This application claims the benefit of Korean Patent Application No. 10-2010-0000194, filed Jan. 4, 2010, entitled "A slip preventing member for turntable", which is hereby incorporated by reference in its entirety into this application.

BACKGROUND OF THE INVENTION

1. Technical Field

The present invention relates to a slip prevention member for turntables.

2. Description of the Related Art

Because of an increasing amount of data being stored, the methods of storing data are recently changing from electric to optical methods. In the case of the electric method, data is stored by varying the electric capacity and the electric resistance of a place for storing data. Such variation is electrically read. In the case of the optical method, data is stored by varying transmissivity, reflexibility, phase, polarization, etc. of light. Such variation is read using laser beams.

An optical disk is an optical memory medium used by the optical method. A digital audio disk (DAD), which is generally referred to as a CD and used to reproduce audio, and a digital video disk (DVD) are representative examples of optical disks. The optical disk is placed onto a turntable which is rotated by a spindle motor and reflects a laser beam radiated from a pick-up unit which is moved in the radial direction of the optical disk. The pick-up reads data using reflexibility of the reflected laser beam or a variation in the phase or polarization of the beam when it is reflected.

However, because the turntable rotates at high speed, the disk placed on the turntable may be removed from or slipped with respect to the turntable, resulting in the problem of the pick-up unit not being able to precisely read the data. In an effort to overcome the problem of a disk slip, a technique in which a slip prevention member is attached to the upper surface of the turntable onto which the disk is placed is being developed or used. A representative example of this technique was proposed in [Patent document 1].

FIG. 1 is a sectional view of a disk chucking device having a slip prevention member 30 disclosed in [Patent document 1]. In this conventional technique, the slip to prevention member 30 made of a rubber sheet is attached to an upper surface of a turntable 20 which is rotated by a drive unit 10. A disk 40 is placed onto the slip prevention member 30. Thus, a slip of the disk 40 is prevented by frictional force between the slip prevention member 30 and the disk 40.

However, the rubber sheet is an environmentally toxic material and the use thereof is thus restricted. Hence, use of the slip prevention member 30 imposes a burden of environmental pollution.

In an effort to overcome the above problem, there was an attempt to produce the slip prevention member 30 using silicone material which can conduct the same function as the rubber sheet. However, because the hardness of the silicon material is very low, it becomes very difficult to attach the slip prevention member 30 to the turntable 20. That is, typically, the slip prevention member 30 is manually attached to the turntable 20 using double-sided adhesive tape. In the case where the slip prevention member 30 is made of silicone material, because the hardness thereof is too low to maintain the original shape thereof, it is very difficult to attach the slip prevention member 30 to the turntable 20 at the correct position such that it is in close contact with the turntable 20.

Moreover, in the case of the silicone material having low hardness, the surface precision thereof is also low. Hence, a surface shaking phenomenon of the disk may be induced, resulting in occurrence of vibrations and noise when the disk rotates at high speed.

[Patent document 1] Japanese Patent Laid-open Publication No. Heisei. 5-135464

SUMMARY OF THE INVENTION

The present invention has been made in an effort to provide a slip prevention member for turntables which reduces use of environmentally toxic material and has a hardness reinforcing layer, thus preventing occurrence of vibrations and noise which may be induced when the hardness of the slip prevention member is relatively low.

In a slip prevention member for turntables according to an embodiment of the present invention, a friction layer prevents a slip of a disk placed on the upper surface thereof. A hardness reinforcing layer is provided under the lower surface of the friction layer. An adhesive layer is provided under the lower surface of the hardness reinforcing layer. A releasable sheet is attached to the lower surface of the adhesive layer.

The friction layer may be formed on the hardness reinforcing layer by applying liquefied frictional material to the hardness reinforcing layer and hardening the frictional material.

The friction layer may be made of silicone.

The friction layer may have a thickness ranging from 0.1 mm to 0.5 mm.

The hardness reinforcing layer may be made of material having a hardness greater than that of the friction layer.

The hardness reinforcing layer may be made of polyurethane resin or PET resin.

The hardness reinforcing layer may have an upper surface processed by pattern treatment.

The hardness reinforcing layer may have an upper surface processed by corona surface treatment.

The hardness reinforcing layer may have a thickness ranging from 0.05 mm to 0.2 mm.

The adhesive layer may comprise adhesive agent or double-sided adhesive tape.

The slip prevention member may be attached to the turntable for placing the disk thereon by the adhesive layer after the releasable sheet is removed.

The slip prevention member may be attached in an annular shape to the perimeter of the upper surface of the turntable for placing the disk thereon.

The slip prevention member may be attached to the perimeter of the upper surface of the turntable for placing the disk thereon in a discontiguous shape in which parts thereof are spaced apart from each other at predetermined intervals.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
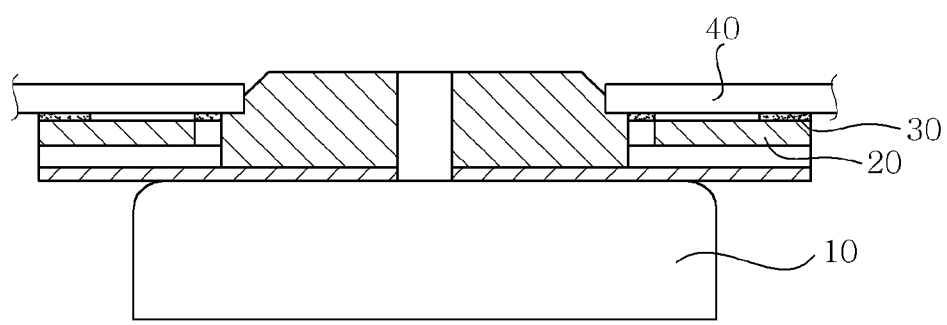
FIG. 1 is a sectional view of a disk chucking device, according to a conventional technique.

Reference now should be made to the drawings in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor to as the best method of illustrating the present invention, and must be interpreted as having had their meanings and concepts adapted to the scope and spirit of the present invention so that the technology of the present invention could be better understood.

Hereinafter, embodiments of the present invention will be described in detail with reference to the attached drawings.

Figure 2:
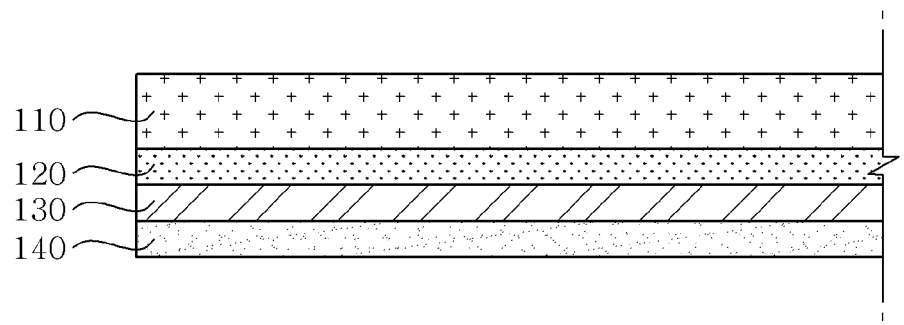
FIG. 2 is a sectional view illustrating a slip prevention member for turntables, according to a first embodiment of the present invention.
Figure 3:
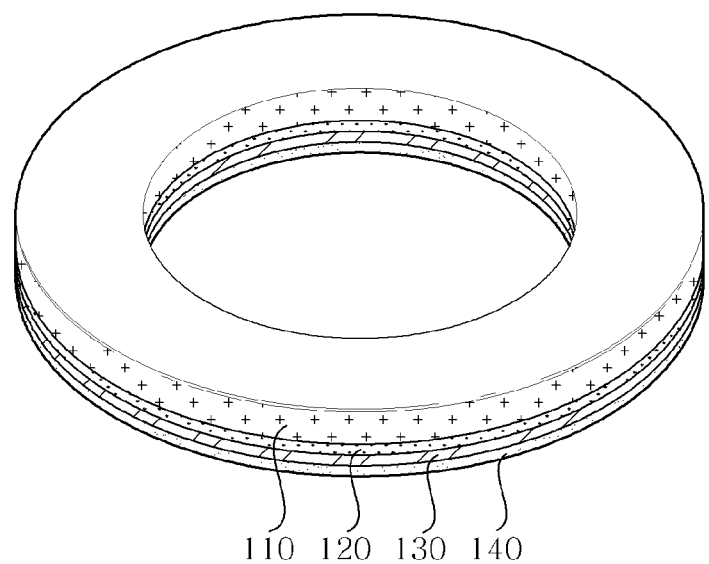
FIG. 3 is a perspective view illustrating a slip prevention member for turntables, according to a first embodiment of the present invention.
Figure 4:
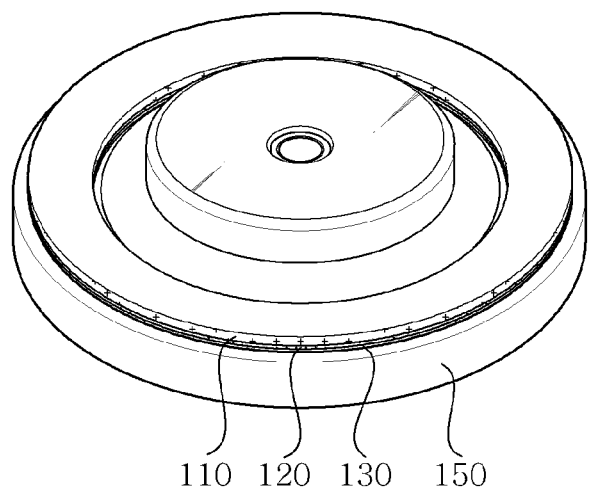
FIG. 4 is a perspective view showing the slip prevention member of FIG. 2 which is placed on a turntable.

FIGS. 2 and 3 respectively are a sectional view and a perspective view illustrating a slip prevention member 100a for turntables, according to a first embodiment of the present invention. FIG. 4 is a perspective view showing the slip prevention member 100a of FIG. 2 which is placed on a turntable 150. The slip prevention member 100a according to the first embodiment of the present invention will be described below with reference to these drawings.

As shown in FIGS. 2 through 4, the slip prevention member 100a according to the first embodiment is provided on the upper surface of the turntable 150 for supporting a disk. The slip prevention member 100a functions to prevent the disk from slipping with respect to the turntable 150 when the disk rotates. The slip prevention member 100a includes a friction layer 110, a hardness reinforcing layer 120, an adhesive layer 130 and a releasable sheet 140.

The friction layer 110 provides a frictional surface for preventing a slip of the disk placed on the upper surface thereof. In the embodiment, the friction layer 110 is directly formed on (or coupled to) the hardness reinforcing layer 120 without using a separate adhesive means.

For example, the friction layer 110 can be directly formed on the hardness reinforcing layer 120 in such a way as to apply liquefied frictional material to the hardness reinforcing layer 120 and then harden the liquefied frictional material. In the case where the friction layer 110 is formed on the hardness reinforcing layer 120 by the above method, a separate adhesive means is not required. Hence, the cost of materials can be reduced. In addition, a problem in that the quality of adhesion between the friction layer 110 and the hardness reinforcing layer 120 is not uniform according to adhesion conditions of the adhesive means can be prevented. Furthermore, the method in which frictional material is applied to the hardness reinforcing layer 120 and then hardened can enhance the coupling force between the friction layer 110 and the hardness reinforcing layer 120, compared to the method in which the two layers are attached to each other using the adhesive means. Thus, a phenomenon in which the friction layer 110 becomes unfastened from the hardness reinforcing layer 120 can be minimized. This prevents problems of surface shaking phenomenon of the disk, vibrations, noise, etc., in particular, when the disk rotates at high speed.

Here, although the friction layer 110 can be made of any material so long as it can provide frictional force sufficient to prevent a slip of the disk placed thereon, it is preferable that silicone material be used to reduce use of environmentally toxic material.

The hardness reinforcing layer 120 reinforces the hardness of the slip prevention member 100a, thus maintaining the shape of the slip prevention member 100a, thereby facilitating attachment of the slip prevention member 100a on the turntable and preventing vibrations and noise attributable to the surface shaking of the disk. The hardness reinforcing layer 120 is provided under the lower surface of the friction layer 110.

In detail, the hardness reinforcing layer 120 provides on the upper surface thereof a space for forming the friction layer 110 and is made of material having a hardness greater than that of the friction layer 110. For example, the hardness reinforcing layer 120 is made of polyurethane resin or PET resin which has a hardness greater than that of silicone material and is easily hardened even at low temperatures so that the workability can be enhanced. As such, the slip prevention member 100a is provided with the hardness reinforcing layer 120. Therefore, the present invention can prevent the problem of noise or vibrations attributable to a surface shaking phenomenon of disk which may be induced when only the friction layer 110 which provides a frictional surface and has low hardness is used. Furthermore, the operation of attaching the slip prevention member 100a to the turntable 150 is facilitated. The role of the hardness reinforcing layer 120 having the above-mentioned functions is accentuated in response to the recent tendency of using the friction layer 110 which is made of silicone material having relatively low hardness to reduce the use of environmentally toxic material.

In the embodiment, to maintain the entire height of the slip prevention member 100a to the same degree as that of the conventional technique despite including the hardness reinforcing layer 120, the thickness of the friction layer 110 is reduced compared to that of the conventional technique. In detail, the hardness reinforcing layer 120 has a predetermined or greater thickness such that it can conduct the intended function for reinforcing the hardness of the slip prevention member 100a. To avoid a problem in that the entire thickness of the slip prevention member 100a is increased by the installation of the hardness reinforcing layer 120, the thicknesses of the hardness reinforcing layer 120 and the friction layer 110 must be minimized within an appropriate range. For example, in the embodiment, the hardness reinforcing layer 120 has a thickness ranging from about 0.05 mm to about 0.2 mm. In this case, the thickness of the friction layer 110 ranges from about 0.1 mm to about 0.5 mm.

Furthermore, as shown in FIGS. 2 through 4, although the hardness reinforcing layer 120 has been illustrated as having a single layer structure, this is only on illustrative example, and it may have a multi-layered structure as necessary.

The adhesive layer 130 is provided under the lower surface of the hardness reinforcing layer 120. When the slip prevention member 100a is attached to the turntable 150, the adhesive layer 130 ensures sufficient adhesive force of the slip prevention member 100a to the turntable 150. For example, the adhesive layer 130 is made of material having predetermined adhesive force, such as an adhesive agent, double-sided adhesive tape, etc.

The releasable sheet 140 covers the lower surface of the adhesive layer 130. The releasable sheet 140 functions to prevent the lower surface of the adhesive layer 130 from being stained with impurities before the slip prevention member 100a is attached to the turntable 150. Here, the releasable sheet 140 is made of material which can be easily detached from the adhesive layer 130.

The slip prevention member 100a having the above-mentioned construction is attached to the turntable 150 using the adhesive layer 130 after the releasable sheet 140 is removed therefrom (refer to FIG. 4). Here, the slip prevention member 100a is attached to the perimeter of the upper surface of the turntable 150 in an annular shape. The disk is placed onto the upper surface of the slip prevention member 100a and is thus prevented from slipping with respect to the turntable 150. In the drawings, although the slip prevention member 100a has been illustrated as having an annular structure, it may be configured such that several pieces are attached on the perimeter of the upper surface of the turntable 150 at positions spaced apart from each other at regular intervals to form a discontiguous structure.

Figure 5:
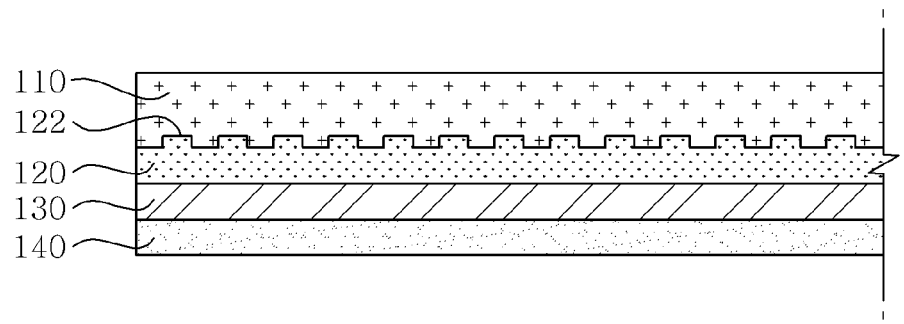
FIG. 5 is a sectional view illustrating a slip prevention member for turntables, according to a second embodiment of the present invention.
Figure 6:
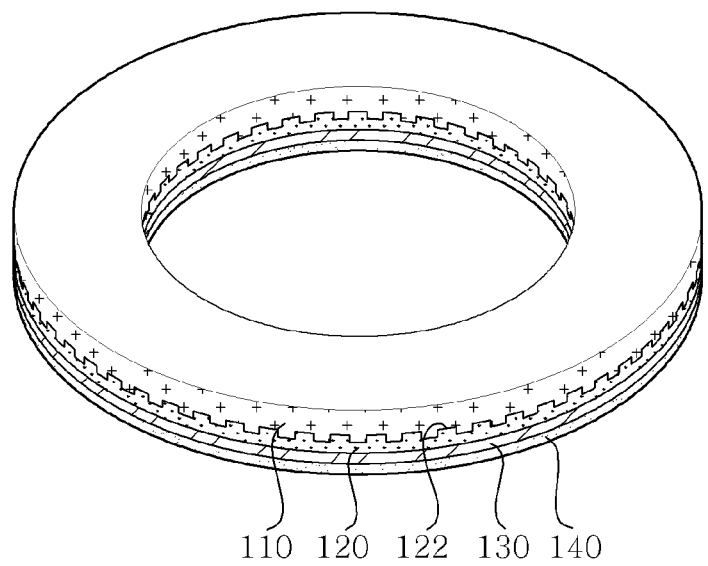
FIG. 6 is a perspective view illustrating a slip prevention member for turntables, according to a second embodiment of the present invention.

FIGS. 5 and 6 respectively are a sectional view and a perspective view illustrating a slip prevention member 100b for turntables, according to a second embodiment of the present invention. In the following description of the second embodiment, the same reference numerals will be used to designate the components corresponding to those of the first embodiment, and the explanation of the overlapped portions will be omitted. Hereinafter, the slip prevention member 100b according to the second embodiment of the present invention will be described with reference to these drawings.

As shown in FIGS. 5 and 6, in the slip prevention member 100b according to the second embodiment, to enhance the coupling force of a friction layer 110 to a hardness reinforcing layer 120, a surface treatment portion 122 is formed on the upper surface of the hardness reinforcing layer 120 onto which the friction layer 110 is attached.

In detail, the surface treatment portion 122 can be formed on the upper surface of the hardness reinforcing layer 120, for example, by pattern treatment or corona surface treatment. Here, the corona surface treatment means that the well known corona discharge is applied to the upper surface of the hardness reinforcing layer 120 to reform the surface of the hardness reinforcing layer 120. The surface treatment portion 122 increases a contact area between the friction layer 110 and the hardness reinforcing layer 120, thus enhancing the force of coupling the friction layer 110 to the hardness reinforcing layer 120. In particular, in the case where the friction layer 110 is formed on the hardness reinforcing layer 120 in such a way as to apply liquefied frictional material to the upper surface of the hardness reinforcing layer 120 and harden it, because the surface treatment portion 122 increases an adhesive area with respect to the friction layer 110 and functions as a support anchor, the force with which the friction layer 110 is coupled to the hardness reinforcing layer 120 can be enhanced.

In the drawings, although the surface treatment portion 122 has been illustrated as being configured such that protrusions having rectangular cross-sections are integrally provided on the hardness reinforcing layer 120 at positions spaced apart from each other at regular intervals, this is only an illustrative example. For example, protrusions of the surface treatment portion 122 may have various shapes, including triangular, semi-circular cross-sections, etc., or the protrusions may be separately provided on the hardness reinforcing layer 120.

Furthermore, a method of forming the surface treatment portion 122 on the hardness reinforcing layer 120 is not limited to a special method.

As described above, in a slip prevention member according to the present invention, because a friction layer is made of silicone material, the use of environmentally toxic material can be minimized. Furthermore, a hardness reinforcing layer is used to reinforce the hardness of the slip prevention member, thus enhancing the workability of operation of attaching the slip prevention member to a turntable. In addition, the surface precision of the slip prevention member can be enhanced by the hardness reinforcing layer, thus minimizing occurrence of vibrations and noise attributable to a surface shaking phenomenon of disk which may be induced when a disk rotates at high speed.

In addition, in the present invention, the hardness reinforcing layer is provided under the lower surface of the friction layer in such a way as to directly couple the friction layer to the hardness reinforcing layer without using a separate adhesive means. Therefore, the cost of materials is reduced, and the coupling force between the two layers can be enhanced.

Moreover, a surface treatment portion may be formed on the hardness reinforcing layer. In this case, the coupling force between the friction layer and the hardness reinforcing layer can be further enhanced.

Although the embodiments of the present invention have been disclosed for illustrative purposes, it will be appreciated that the slip prevention member for turntables according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A slip prevention member for a turntable, comprising:
a friction layer to prevent a slip of a disk placed on an upper surface thereof;
a hardness reinforcing layer provided under a lower surface of the friction layer and made of material having a hardness greater than a hardness of the friction layer; and
an adhesive layer provided under a lower surface of the hardness reinforcing layer;
wherein the hardness reinforcing layer has a surface treatment portion, the surface treatment portion is formed on an upper surface of the hardness reinforcing layer and has protrusions that are spaced apart from each other at regular intervals to increase an adhesive area between the friction layer and the hardness reinforcing layer.

2. The slip prevention member as set forth in claim 1, wherein the friction layer is made of silicone.

3. The slip prevention member as set forth in claim 1, wherein the friction layer has a thickness ranging from 0.1 mm to 0.5 mm.

4. The slip prevention member as set forth in claim 1, wherein the hardness reinforcing layer is made of polyurethane resin or PET resin.

5. The slip prevention member as set forth in claim 1, wherein the hardness reinforcing layer has a thickness ranging from 0.05 mm to 0.2 mm.

6. The slip prevention member as set forth in claim 1, wherein the adhesive layer comprises adhesive agent or double-sided adhesive tape.

7. The slip prevention member as set forth in claim 1, wherein the slip prevention member is attached in an annular shape to a perimeter of an upper surface of the turntable for placing the disk thereon.

8. The slip prevention member as set forth in claim 1, wherein the slip prevention member is attached to a perimeter of an upper surface of the turntable for placing the disk thereon in a discontiguous shape in which parts thereof are spaced apart from each other at predetermined intervals.

* * * * *